United States Patent
Kim et al.

(10) Patent No.: US 11,754,876 B2
(45) Date of Patent: Sep. 12, 2023

(54) DISPLAY APPARATUS

(71) Applicant: SAMSUNG ELECTRONICS CO., LTD., Suwon-si (KR)

(72) Inventors: Bupmyoung Kim, Suwon-si (KR); Sungho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/716,722

(22) Filed: Apr. 8, 2022

(65) Prior Publication Data

US 2022/0397794 A1 Dec. 15, 2022

Related U.S. Application Data

(63) Continuation of application No. PCT/KR2022/004022, filed on Mar. 23, 2022.

(30) Foreign Application Priority Data

Jun. 9, 2021 (KR) .................... 10-2021-0074533

(51) Int. Cl.
*G02F 1/13357* (2006.01)
*G02F 1/1335* (2006.01)

(52) U.S. Cl.
CPC .. *G02F 1/133603* (2013.01); *G02F 1/133607* (2021.01); *G02F 1/133608* (2013.01); *G02F 1/133612* (2021.01)

(58) Field of Classification Search
None
See application file for complete search history.

(56) References Cited

U.S. PATENT DOCUMENTS

| | | | |
|---|---|---|---|
| 2006/0092348 A1* | 5/2006 | Park | G02F 1/133603 349/64 |
| 2016/0161661 A1 | 6/2016 | Cho et al. | |
| 2016/0209578 A1 | 7/2016 | Cho et al. | |
| 2016/0320668 A1 | 11/2016 | Kong et al. | |
| 2017/0009960 A1 | 1/2017 | Ahn et al. | |
| 2018/0156966 A1 | 6/2018 | Cho et al. | |
| 2019/0064589 A1* | 2/2019 | Park | G02F 1/133602 |
| 2022/0150629 A1 | 5/2022 | Choi et al. | |
| 2022/0339682 A1* | 10/2022 | Middleton | B02C 21/00 |

FOREIGN PATENT DOCUMENTS

| | | |
|---|---|---|
| CN | 202327895 U | 7/2012 |
| CN | 202813043 U | 3/2013 |
| CN | 108488693 A | 9/2018 |

(Continued)

OTHER PUBLICATIONS

International Search Report (PCT/ISA/210) dated Jul. 4, 2022 issued by the International Searching Authority in International Application No. PCT/KR2022/004022.

*Primary Examiner* — Richard H Kim
(74) *Attorney, Agent, or Firm* — Sughrue Mion, PLLC

(57) ABSTRACT

A display apparatus includes: a display panel; a light source module provided behind the display panel, the light source module including a board and a light source provided on a rear surface of the board; a rear chassis covering a rear surface of the light source module; and a supporter extending between the board and the rear chassis, the supporter being electrically conductive.

15 Claims, 7 Drawing Sheets

(56) References Cited

FOREIGN PATENT DOCUMENTS

| | | |
|---|---|---|
| CN | 108563069 A | 9/2018 |
| CN | 108681118 A | 10/2018 |
| CN | 208606014 U | 3/2019 |
| CN | 109946880 A | 6/2019 |
| CN | 111781772 A | 10/2020 |
| JP | 2012-43860 A | 3/2012 |
| JP | 2019-21450 A | 2/2019 |
| KR | 10-2008-0057780 A | 6/2008 |
| KR | 10-1572165 B1 | 11/2015 |
| KR | 10-2016-0128799 A | 11/2016 |
| KR | 10-2017-005537 A | 1/2017 |
| KR | 10-2017-0097453 A | 8/2017 |
| KR | 10-2017-0115003 A | 10/2017 |

\* cited by examiner

DISPLAY APPARATUS

CROSS-REFERENCE TO RELATED APPLICATION(S)

This application is a by-pass continuation application of International Application No. PCT/KR2022/004022 filed on Mar. 23, 2022, which is based on and claims priority to Korean Patent Application No. 10-2021-0074533, filed on Jun. 9, 2021 in the Korean Intellectual Property Office, the disclosure of which is incorporated by reference herein in its entirety.

BACKGROUND

1. Field

The disclosure relates to a display apparatus, and more particularly, to a display apparatus with an improved light emitting diode (LED) unit.

2. Description of Related Art

A display apparatus is a kind of an output apparatus for visually displaying images and data information, such as characters, figures, etc.

The display apparatus includes a self-emissive display panel such as an organic light-emitting diode (OLED) panel or a non-emissive display panel such as a liquid crystal display (LCD) panel.

A liquid crystal display apparatus includes a display panel for displaying a screen, and a backlight unit for supplying light to the display panel.

A backlight unit having a glass board structure is configured by designing a detour of a printed circuit wiring formed on a board up to the edge of the board to electrically connect the printed circuit wiring to a circuitry, in order to implement a local dimming function. In the case of designing the detour of the printed circuit wiring up to the edge of the board, a process is added, and a chip on film (COF) bonded with an anisotropic conductive film (ACF) may lower reliability against vibrations, etc.

SUMMARY

Provided is a display apparatus with a simplified process.

Further, provided is a display apparatus with improved reliability.

Additional aspects will be set forth in part in the description which follows and, in part, will be apparent from the description, or may be learned by practice of the presented embodiments.

According to an aspect of the disclosure, a display apparatus includes: a display panel; a light source module provided behind the display panel, the light source module including a board and a light source provided on a rear surface of the board; a rear chassis covering a rear surface of the light source module; and a supporter extending between the board and the rear chassis, the supporter being electrically conductive.

The board may include a glass material.

The display apparatus may further include a printed circuit wiring extending from the light source and electrically connected to the supporter, and the printed circuit wiring is provided on the rear surface of the board.

The display apparatus may further include a printed circuit wiring extending from the light source and electrically connected to the supporter, and the printed circuit wiring may include a wiring contact portion contacting the supporter.

The display apparatus may further include a circuitry provided on the rear chassis and configured to control the light source module, and the supporter may be electrically connected to the circuitry.

The supporter may support the board and the rear chassis to maintain a constant distance between the board and the rear chassis.

The supporter may have a shape of a cone, a cylinder, a polyprism, or a polypyramid.

The supporter may include metal.

The display apparatus may further include a light conversion member provided between the display panel and the light source module, the light conversion member including a Quantum Dot (QD) device.

The display apparatus may further include an optical sheet provided between the display panel and the light conversion member.

The light source may contact the rear chassis.

The light source may be configured to emit light in a direction in which the light source is mounted on the board.

The board may be configured to diffuse light received from the light source.

The board may be configured to transmit light emitted from the light source.

An emitting surface of the light source, from which light is emitted, may be adjacent to a mounting surface of the board.

According to an aspect of the disclosure, a display apparatus includes: a display panel; a light source module provided behind the display panel, the light source module including a board formed of glass and having a printed circuit wiring formed thereon, and a light source provided on a rear surface of the board; a rear chassis covering a rear surface of the light source module; a circuitry provided on the rear chassis; and a supporter electrically connecting the printed circuit wiring and the circuitry, the supporter extending between the board and the rear chassis.

The supporter may be contact with the substrate and the rear chassis.

The supporter may include metal.

The supporter may support the board and the rear chassis to maintain a constant distance between the board and the rear chassis.

The display apparatus may further include a light conversion member provided between the display panel and the light source module, the light conversion member including a Quantum Dot (QD) device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Configurations illustrated in the embodiments and the drawings described in the present specification are example embodiments of the disclosure, and thus it is to be understood that various modified examples, which may replace the embodiments and the drawings described in the present specification, are possible when filing the present application.

Also, the terms used in the present specification are merely used to describe embodiments, and are not intended to restrict and/or limit the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the disclosure.

In the following description, the terms "front-back direction", "left-right direction", "front direction", "rear direction", etc. are defined based on the drawings, and the shapes and positions of the corresponding components are not limited by the terms.

Throughout the disclosure, the expression "at least one of a, b or c" indicates only a, only b, only c, both a and b, both a and c, both b and c, all of a, b, and c.

Apparatuses for displaying images are collectively called display apparatuses. A display apparatus may include a television, a monitor, a mobile device, etc. Hereinafter, a television will be described as an example of a display apparatus. The television may include a flat television, a curved television, a bendable display, etc., and hereinafter, a flat television will be described as an example of a television.

Figure 1:
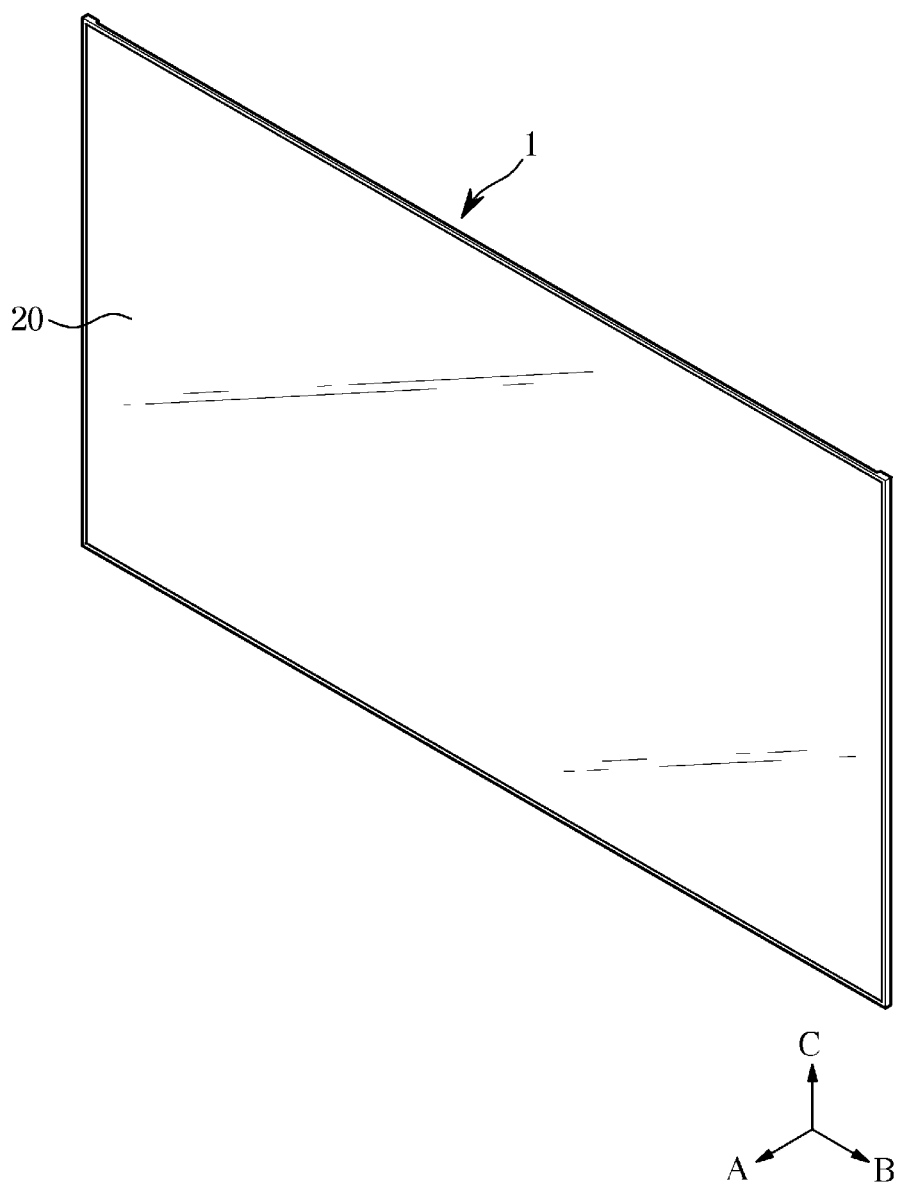
FIG. 1 shows a display apparatus according to an embodiment of the disclosure.
Figure 2:
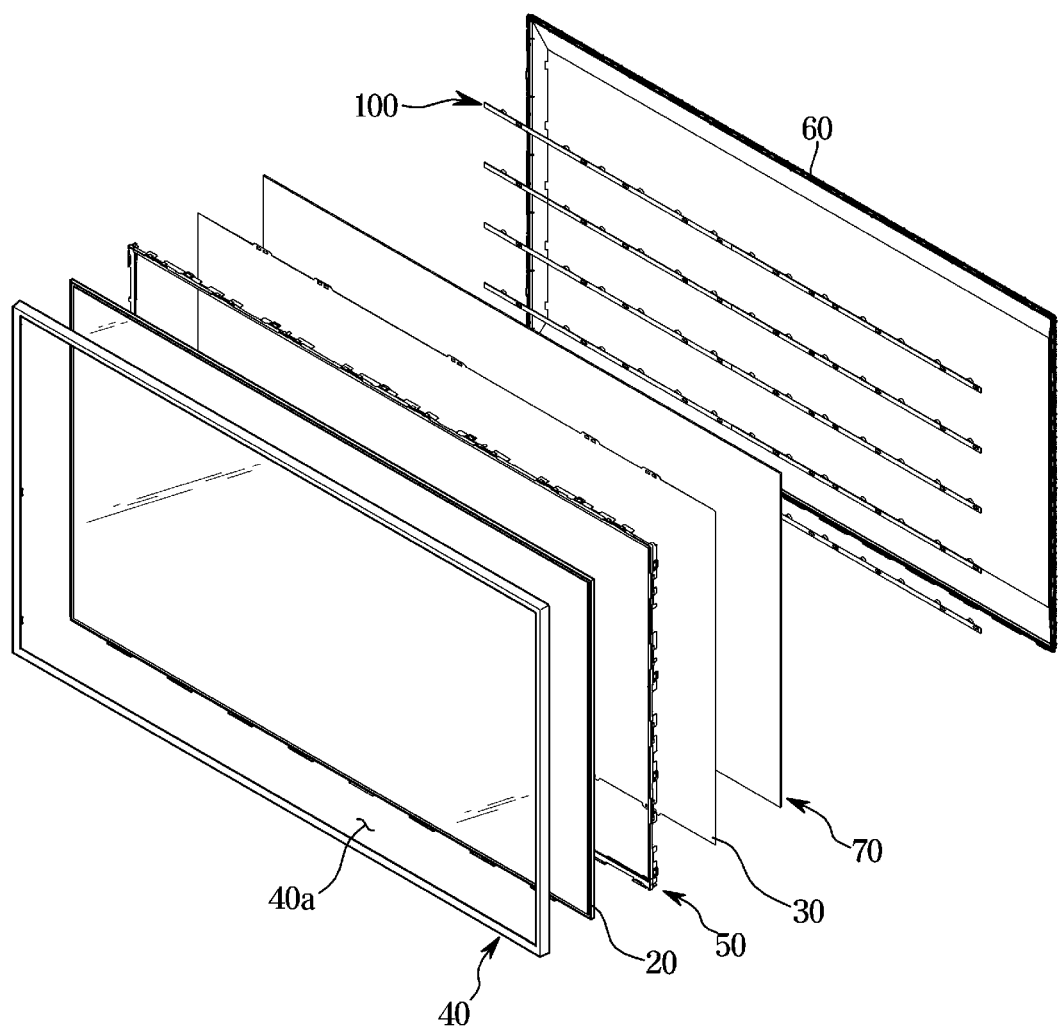
FIG. 2 is an exploded view of the display apparatus shown in FIG. 1.
Figure 3:
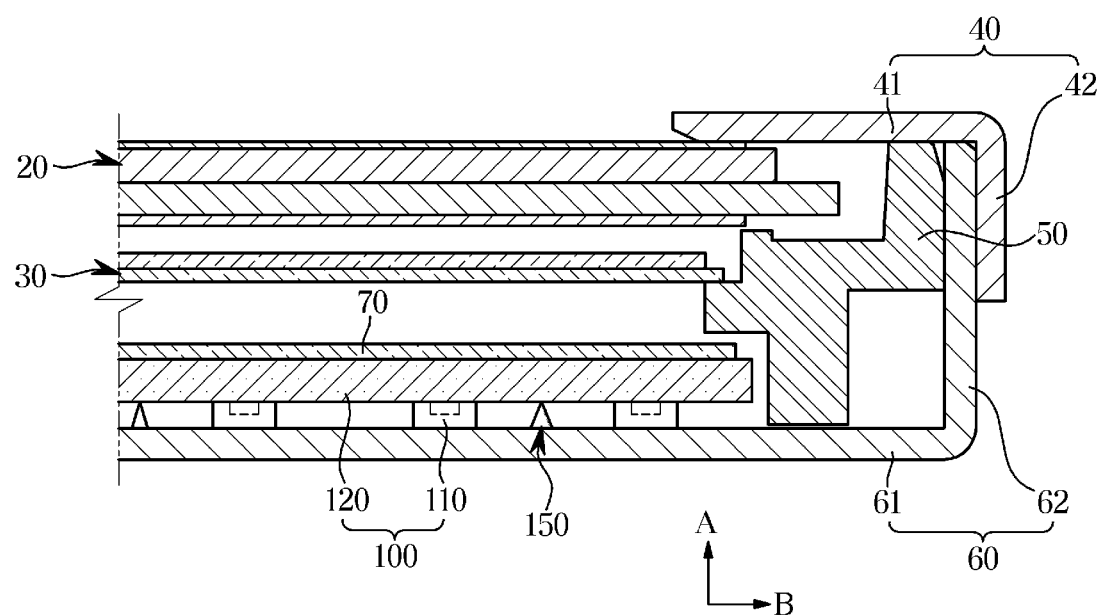
FIG. 3 shows a cross section of a portion of the display apparatus shown in FIG. 1.
Figure 4:
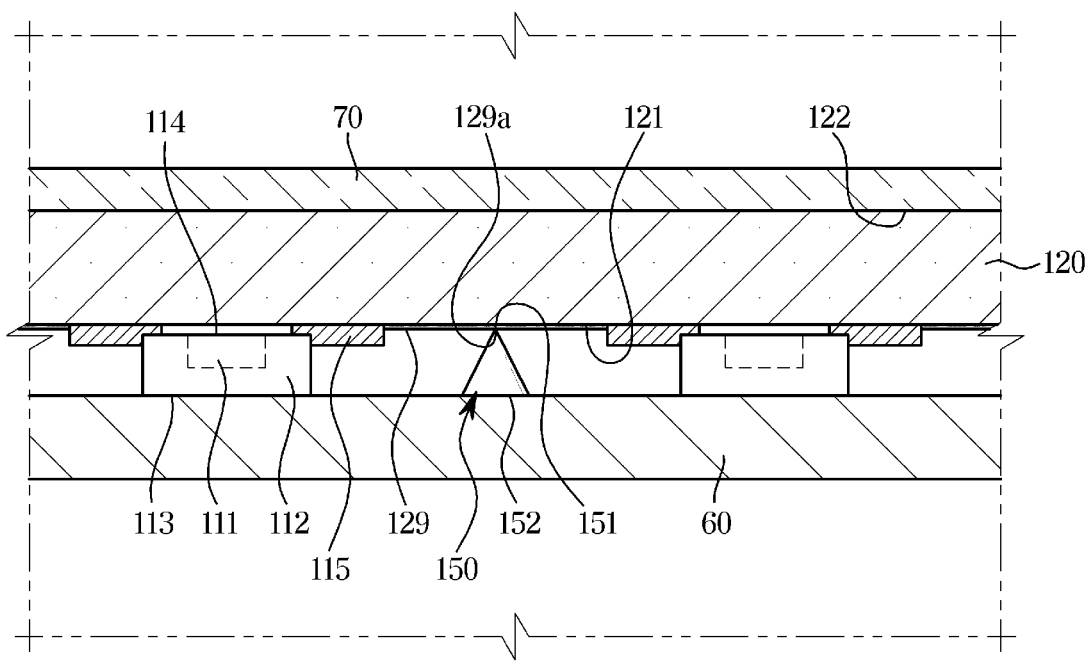
FIG. 4 is an exploded view of the portion shown in FIG. 3.

FIG. 1 shows a display apparatus according to an embodiment of the disclosure. FIG. 2 is an exploded view of the display apparatus shown in FIG. 1. FIG. 3 shows a cross section of a portion of the display apparatus shown in FIG. 1. FIG. 4 is an exploded view of the portion shown in FIG. 3.

As shown in FIGS. 1, 2, and 3, a display apparatus 1 may include a display panel 20, and a chassis assembly accommodating and supporting a backlight unit.

The display panel 20 may be a liquid crystal panel formed by filling liquid crystal between two glass boards on which electrodes are mounted, and may display images in a front direction.

The display panel 20 may display images toward a first direction A which is the front direction.

The chassis assembly may include a front chassis 40, a middle mold 50, and a rear chassis 60.

The front chassis 40 may include an opening 40a for exposing the display panel 20. The front chassis 40 may include a bezel 41 covering front edges of the display panel 20, and a top side portion 42 bent backward from ends of the bezel 41 and covering side surfaces of the middle mold 50.

The front chassis 40 may be coupled with a front portion of the middle mold 50 to maintain a state in which the display panel 50 is installed in the middle mold 50.

The display panel 20 and the front chassis 40 may be installed in this order in the front portion of the middle mold 50, and the rear chassis 60 may be installed in a rear portion of the middle mold 50. The middle mold 50 may keep the display panel 20 and the rear chassis 60 spaced from each other, while supporting the individual components.

The rear chassis 60 may include a rear portion 61, and a bottom side portion 62 extending in the front direction from a circumference of the rear portion 61 and coupled in the middle mold 50.

The rear chassis 60 may be formed in a shape of a high-strength multi-angular plate, and may include a metal material (for example, aluminum, an aluminum alloy, etc.) with little deformation caused by heat that is generated by heating of an accommodated light source module 100 and/or the display panel 20.

The rear chassis 60 may be made of a material having high heat conductivity. Accordingly, the rear chassis 60 may easily radiate heat generated by the light source module 100, thereby improving reliability of the display apparatus 1.

The rear chassis 60 may be molded with a plastic material (for example, poly carbonate (PC)) or by adding a glass fiber in a plastic material.

However, at least one of the front chassis 40 or the middle mold 50 may be omitted, or the front chassis 40 and the middle mold 50 may be integrated into one body, unlike the current embodiment of the disclosure.

The display apparatus 1 may further include a housing surrounding the chassis assembly to protect and accommodate the chassis assembly, or a rear cover covering the rear portion 61 of the rear chassis 60.

Inside the housing, a power board for supplying power to the display apparatus 1, a signal processing board for processing various images and sound signals, and a timing control board for transferring image signals to the display panel 20 may be positioned.

The display apparatus 1 may further include the backlight unit for supplying light to the display panel 20.

The light source module 100 may include a light source 110 for emitting light.

The backlight unit may be a direct type in which the light source 110 is positioned immediately below the display panel 20, as in the current embodiment of the disclosure. The backlight unit may include a light source module 100 configured with the light source 110 and a board 120 on which the light source 110 is mounted, and various optical sheets 30 positioned on a traveling path of light emitted from the light source module 100.

The light source 110 may be a light emitting diode (LED) package in which an LED emitting light is accommodated. The light source module 100 may supply light to the display panel 20. The light source module 100 may supply light to the display panel 20 from behind the display panel 20. The light source module 100 may be positioned behind the display panel 20, that is, the light source module 100 may be positioned in an opposite direction of the first direction A with respect to the display panel 20.

The light source 110 of the light source module 100 may be a mini-LED formed as an LED chip having a size of 100 μm to 300 μm, unlike a normal LED.

Also, unlike the current embodiment of the disclosure, a cold cathode fluorescent lamp (CCFL) or an external electrode fluorescent lamp (EEFL) may be used as the light source 110.

The board 120 may be provided in a shape of a bar extending in a second direction B that is orthogonal to the first direction A, i.e., in a left-right direction. That is, the board 120 may have a longitudinal portion extending in the left-right direction or in the second direction B.

The board 120 may be formed of a glass material. However, the board 120 is not limited thereto and may be formed of a material having different properties.

A plurality of boards 120 may be provided, and the plurality of boards 120 may be spaced from each other in a third direction C that is orthogonal to the first direction A and the second direction B, i.e., in an up-down direction.

The plurality of boards 120 may have the same configuration, and hereinafter, a board 120 of the plurality of boards 120 will be described.

The board 120 may be coupled with the rear chassis 60. The board 120 may be coupled with the rear chassis 60 such that the light source 110 emits light toward the display panel 20.

A plurality of light sources 110 may be mounted on the board 120 in such a way as to be spaced from each other at preset intervals in the second direction B. The plurality of light sources 110 may have the same configuration, and hereinafter, a light source 110 of the plurality of light sources 110 will be described.

A printed circuit wiring 129 for transferring a driving voltage and a signal to the light source 110 may be formed on the board 120.

Light emitted from the light source module 100 may be supplied directly to the display panel 20, unlike an edge type display apparatus. To improve properties of light emitted from the light source module 100, an optical sheet 30 may be positioned between the light source module 100 and the display panel 20.

The optical sheet 30 may include a prism sheet, a protective sheet, etc.

The prism sheet may include a prism pattern having a shape of a trigonal prism, and a plurality of prism patterns may be arranged adjacent to each other to form a shape of a plurality of bands. The prism pattern may be arranged in rows as a repeating pattern of mountains and valleys, and protrude toward the display penal 20. Light diffused from the light source module 100 may be transmitted through the prism pattern and refracted, and accordingly, light may be incident vertically to the display panel 20.

The protective sheet may be a configuration for protecting various components from an external impact or the inflow of a foreign material. Particularly, the protective sheet may prevent the prism sheet from being scratched.

The display apparatus 1 may include a light conversion member 70 for changing a wavelength of light emitted from the light source module 100.

The light conversion member 70 may be positioned between the display panel 20 and the light source module 100. While light emitted from the light source module 100 is transmitted through the light conversion member 70, a wavelength of the transmitted light may change, and the light having the changed wavelength may enter the display panel 20.

The light source module 100 may emit blue light. In this case, the blue light may be light being partially close to green. Blue light generated in the light source module 100 may be converted to white light through the light conversion member 70.

The light conversion member 70 may include quantum dots (QDs).

The light conversion member 70 may convert a color of light emitted from the light source module 100 and entered the light conversion module 70, and emit light of another color. For example, the light conversion member 70 may convert blue light emitted from the light source module 100 and entered the light conversion member 70 into red light and green light (or yellow light) through various QDs, and then emit the converted light to outside. More specifically, the light conversion member 70 may change a wavelength of incident light and emit light having a color that is different from that of the incident light (wavelength shift).

A QD to which a voltage is applied may itself emit or absorb light, thereby emitting light of a preset wavelength.

Electrons of QDs, which are in a stable state, are at a low energy level (or band). At this time, in a case in which the QDs absorb light from outside, the electrons at the low energy level move to a high energy level (or band). Because the electrons at the high energy level are in an unstable state, the electrons naturally move from the high energy level to the low energy level. While the electrons move from the high energy level to the low energy level, the electrons emit light corresponding to an energy difference between the high energy level and the low energy level, wherein a wavelength of the emitted light depends on the energy difference between the high energy level and the low energy level.

Particularly, a QD having a smaller size emits light of a shorter wavelength, and a QD having a larger size emits light of a longer wavelength. For example, a QD having a diameter of 2 nanometers (nm) may emit blue light, and a QD having a diameter of about 10 nm may emit red light.

Also, QDs having various sizes may be used to output light of various wavelengths from red light to blue light. In other words, by using QDs having various sizes, light having natural colors may be generated.

The light conversion member 70 may be manufactured by distributing QDs into a resine. Light entered the light conversion member 70 from the light source module 100 may excite electrons of QDs included in the light conversion member 70. In other words, electrons at a low energy level (or band) move to a high energy level (or band) by incident light.

Thereafter, while the excited electrons move from the high energy level to the low energy level, the QDs output light of various wavelengths according to their sizes. The light of various wavelengths may generate an image through the display panel 20.

Accordingly, in a case in which blue light exiting the light source module 100 is incident to the light conversion member 70, green light and red light may be emitted by green light QDs and red light QDs.

Finally, white light in which light having three different wavelengths coexists may be incident to the display panel 20 by the blue light exiting the light source module 100 and the green light and red light exiting the light conversion member 70.

Referring to FIG. 4, the light source module 100 may include the board 120 facing the display panel 20 in the first direction A being the front direction, and the light source 110 emitting light in the first direction A and mounted on a mounting surface 121 of the board 120 toward the rear direction which is opposite to the first direction A.

The mounting surface 121 may form a rear surface of the board 120 in the front-back direction.

As described above, the board 120 may be made of a glass material, and the board 120 may include an exit surface 122 which faces the display panel 20 in the first direction A and from which light emitted from the light source 110 exits. Light emitted from the light source 110 may be transmitted through the display panel 20.

The exit surface 122 may form a front surface of the board 120 in the front-back direction.

In the light source module 100, the board 120 and the light source 110 may be positioned in this order in the first direction A. Accordingly, inside the display apparatus 1, the display panel 20, the board 120, the light source 110, and the rear chassis 60 may be positioned in this order in the first direction A.

The light source 110 may include an LED chip 111 that generates light. The light source 110 may include an emitting surface 114 from which light generated by the LED chip 111 is emitted.

The emitting surface 114 may be positioned toward the first direction A. The emitting surface 114 may face the board 120.

The light source 110 may include a housing 112 covering the LED chip 111 and having the emitting surface 114.

The light source 110 may be directly in contact with the rear chassis 60. The light source 110 may be in contact with the rear chassis 60 in the opposite direction of the first direction A.

The light source 110 may include a contact surface 113 that is opposite to the emitting surface 114, and the contact surface 113 may be in contact with the rear chassis 60.

The expression "in contact with" may include a case in which the contact surface 113 is in direct contact with the rear chassis 60 and a case in which the contact surface 113 is in contact with the rear chassis 60 via a contact member bringing the contact surface 113 into contact with the rear chassis 60.

The housing 112 may be made of a material having a heat conductivity that is higher than a heat conductivity of the board 120.

A direction in which the light source 110 is mounted on the board 120 may be the same as a direction in which light from the light source 110 is emitted. The direction in which the light source 110 is mounted on the board 120 and the direction in which light from the light source 110 is emitted may be the first direction A toward the display panel 20.

The light source 110 may include a coupling portion 115 through which the light source 110 is coupled with the board 120. The coupling portion 115 may bring a lead of the light source 110 into contact with the printed circuit wiring 129 of the board 120. The coupling portion 115 may be formed as a lead frame of the light source 110.

The coupling portion 115 and the emitting surface 114 of the light source 110 may be positioned on the same side of the housing 112. The coupling portion 115 and the emitting surface 114 of the light source 110 may be positioned on one end of the housing 112 toward the first direction A.

Accordingly, the light source 110 may be mounted on the mounting surface 121 of the board 120 toward the opposite direction of the first direction A, and emit light toward the first direction A.

That is, the light source module 100 may cause light emitted from the light source 110 to be transmitted through the board 120 in the first direction A and head toward the display panel 20.

Also, the board 120 may be positioned in the display apparatus 1 such that the light source 110 is positioned closer to the rear chassis 60 than the board 120, more particularly, the light source 110 is directly in contact with the rear chassis 60.

Accordingly, the board 120 may be spaced from the rear chassis 60. A separation distance between the board 120 and the rear chassis 60 in the opposite direction of the first direction A may be longer than a separation distance between the light source 110 and the rear chassis 60.

The board 120 may be made of a glass material, as described above, such that light is transmitted through the board 120. However, the board 120 may include an opaque material to lower transparency.

Light transmitted through the board 120 may be diffused by the opaque material of the board 120 and then exit through the exit surface 122.

In a case in which light emitted from the light source module 100 directly enters the eye, an arrangement pattern of the plurality of light sources 110 may be reflected as it is on the eye. Therefore, the board 120 may diffuse light to cancel or minimize the pattern.

The exit surface 122 of the board 120 may include a patterning for additionally diffusing light being transmitted through the exit surface 122. The light being transmitted through the exit surface 122 may be additionally diffused and reflected by the patterning, and accordingly, the light may exit uniformly in all directions.

As such, the board 120 may function as a diffusion sheet which is a configuration of an existing display apparatus by diffusing light being transmitted through the board 120.

Accordingly, the display apparatus 1 according to an embodiment of the disclosure may cause the board 120 to diffuse light emitted from the light source 110 and transfer the diffused light to the display panel 20, without including a configuration of a diffusion sheet.

Because the display apparatus 1 does not include a diffusion sheet, a problem that a diffusion sheet is expanded by heat generated by the light source module 100 may be prevented, and because a diffusion sheet is not provided, the display apparatus 1 may become slimmer in the first direction A.

The emitting surface 114 of the light source 110 may be in contact with the board 120 or spaced a slight gap from the board 120. Accordingly, a major portion of light emitted from the light source 110 may be transmitted through the board 120 without being reflected on the incident surface (or the mounting surface 121) of the board 120, which raises light efficiency.

That is, because the light source 110 emits light toward the board 120 in close proximity to the board 120, and the emitted light is transmitted through the board 120 without forming a great incident angle to an incident surface of the board 120, a major portion of the emitted light may be transmitted into the board 120 without being reflected on the incident surface of the board 120.

Accordingly, the display apparatus 1 may not include a reflective sheet included in a related art display apparatus.

The reflective sheet of the existing display apparatus has been provided to reflect light emitted from a light source module and reflected on an incident surface of a diffusion sheet by a great incident angle toward the diffusion sheet.

However, in the display apparatus 1 according to an embodiment of the disclosure, because a major portion of light emitted from the light source 110 is transmitted through the board 120 without being reflected, as described above, a need for a reflective sheet may be lowered.

The light conversion member 70 may be positioned on the exit surface 122 of the board 120. The light conversion member 70 may be positioned on the board 120 in the first direction A. The light conversion member 70 may be positioned adjacent to the light source module 100. Because the board 120 has low heat conductivity, as described above, heat radiated through the rear chassis 60 may be more than heat conducted through the board 120. Accordingly, the light conversion member 70 may be not discolored although the light conversion member 70 is positioned on the light source module 100.

Because the light conversion member 70 is positioned on the exit surface 122 of the board 120, light exiting the exit surface 122 may be transmitted directly through the light conversion member 70, which increases light efficiency of the display apparatus 1.

The display apparatus 1 may include a supporter 150 positioned between the board 120 and the rear chassis 60. The supporter 150 may maintain a constant distance between the board 120 and the rear chassis 60. The supporter 150 may extend between the rear chassis 60 and the board 120. The supporter 150 may support the rear chassis 60 and the board 120.

The supporter 150 may include a first supporter contact portion 151 being in contact with a wiring contact portion 129a of the printed circuit wiring 129, and a second supporter contact portion 152 being in contact with the rear chassis 60. The first supporter contact portion 151 may be provided in one end in longitudinal direction of the supporter 150, and the second supporter contact portion 152 may be provided in the other end of the supporter 150, which is opposite to the one end in longitudinal direction of the supporter 150 in which the first supporter contact portion 151 is provided.

In FIGS. 3 and 4, the supporter 150 is shown to have a cone or polypyramid shape. However, the shape of the supporter 150 is not limited to these, and the supporter 150 may have another shape, such as a polyprism or a cylinder. The shape of the supporter 150 may be determined by considering a design of a wiring between the light source 110 and a circuitry 80.

Figure 5:
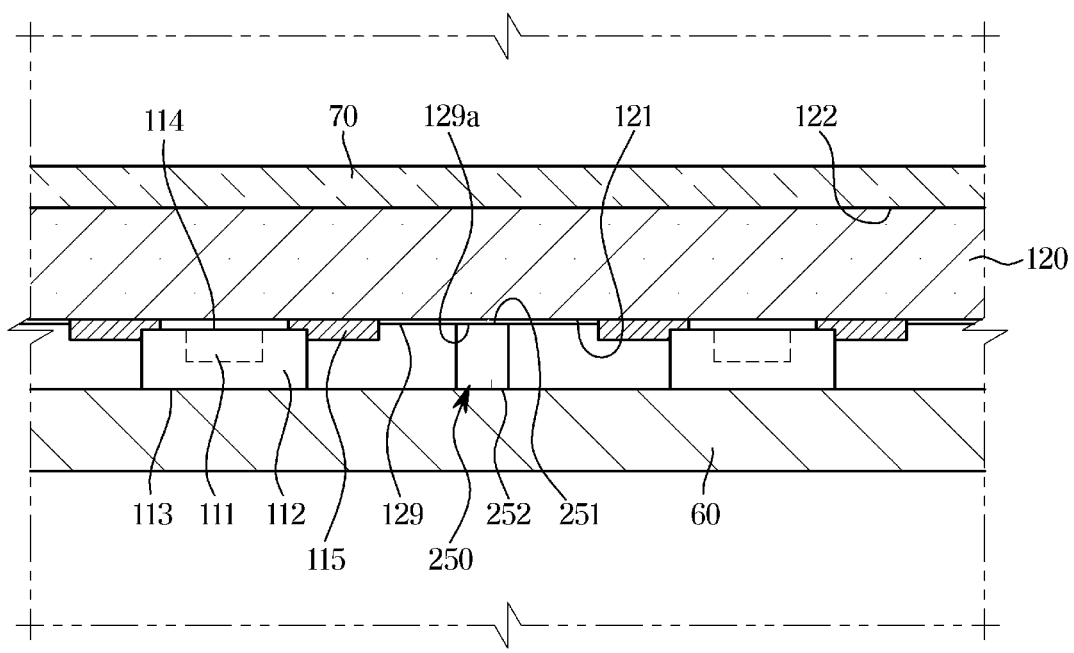
FIG. 5 shows another embodiment of a supporter shown in FIG. 4.

FIG. 5 shows another embodiment of a supporter shown in FIG. 4.

Referring to FIG. 5, a supporter 250 may have a cylinder shape or a polyprism shape of which the base side is a polygon. Referring to FIG. 5, the supporter 250 may have a pillar shape having a constant cross-sectional area in a longitudinal direction of the supporter 250.

The supporter 250 may include a first supporter contact portion 251 being in contact with the wiring contact portion 129a of the printed circuit wiring 129, and a second supporter contact portion 252 being in contact with the rear chassis 60. The first supporter contact portion 251 may be provided in one end in longitudinal direction of the supporter 250, and the second supporter contact portion 252 may be provided in the other end of the supporter 250, which is opposite to the one end in longitudinal direction of the supporter 250 in which the first supporter contact portion 251 is provided.

Figure 6:
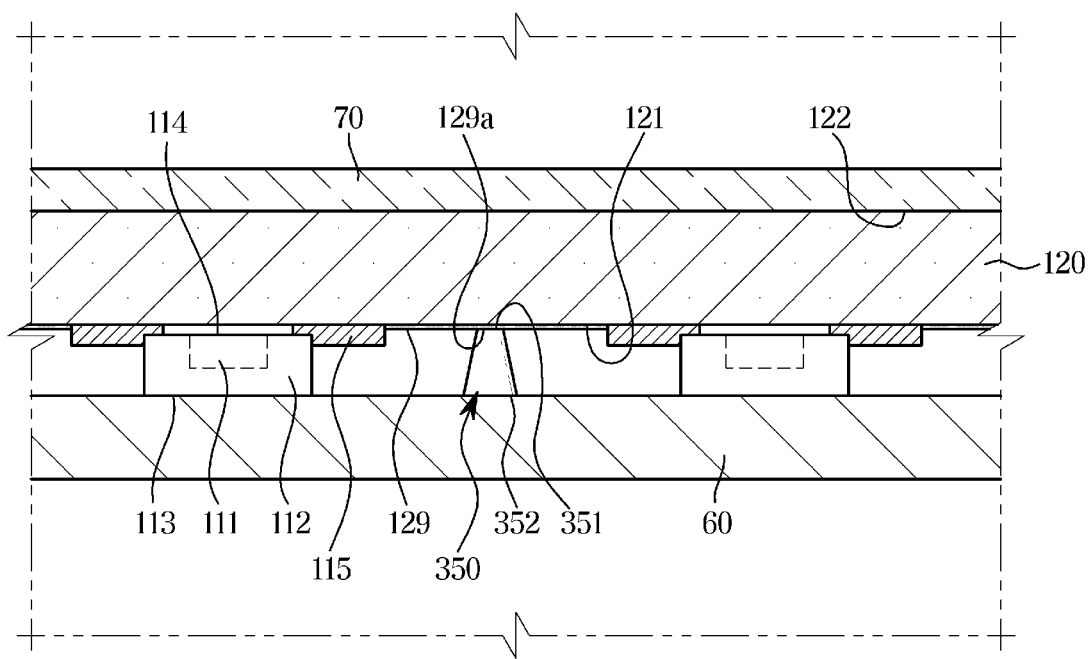
FIG. 6 shows another embodiment of the supporter shown in FIG. 4.

FIG. 6 shows another embodiment of the supporter shown in FIG. 4.

Referring to FIG. 6, a supporter 350 may have a polypyramid shape of which the base side is a polygon. Unlike the supporter 250 shown in FIG. 5, the supporter 350 shown in FIG. 6 may have a polypyramid shape of which a cross-sectional area changes in a longitudinal direction.

The supporter 350 may include a first supporter contact portion 351 being in contact with the wiring contact portion 129a of the printed circuit wiring 129, and a second supporter contact portion 352 being in contact with the rear chassis 60. The first supporter contact portion 351 may be provided in one end in longitudinal direction of the supporter 350, and the second supporter contact portion 352 may be provided in the other end of the supporter 350, which is opposite to the one end in longitudinal direction of the supporter 350 in which the first supporter contact portion 351 is provided.

Referring to FIGS. 3 and 4, the supporter 350 may be electrically connected to the printed circuit wiring 129 formed on the board 120. The supporter 150 may be formed as a conductor. The supporter 150 may be formed of metal.

The printed circuit wiring 129 formed on the board 120 may extend from the light source 110. The printed circuit wiring 129 may be formed on the rear surface of the board 120. The printed circuit wiring 129 may include the wiring contact portion 129a being in contact with the supporter 150. As the wiring contact portion 129a is in contact with the first supporter contact portion 151 of the supporter 150, the supporter 150 may be electrically connected to the printed circuit wiring 129.

The circuitry 80 for controlling the light source module 100 may be positioned on the rear chassis 60. As the supporter 150 is in contact with the rear chassis 60, the circuitry 80 may be electrically connected to the supporter 150. A wiring extending from the circuitry 80 may be provided on the rear chassis 60. The second supporter contact portion 152 of the supporter 150 may be in contact with the rear chassis 60.

Figure 7:
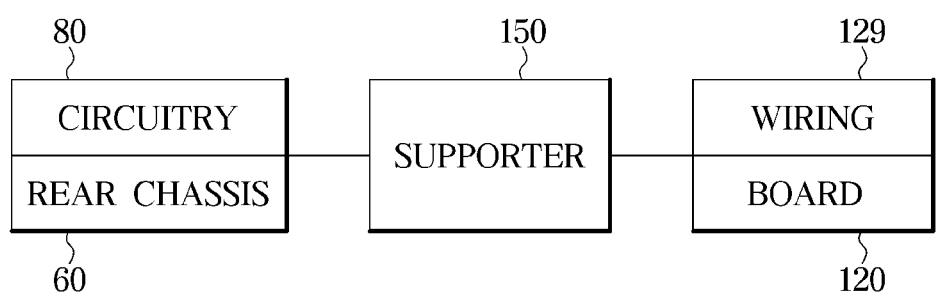
FIG. 7 is a block diagram showing a connection relationship of a supporter of a display apparatus according to an embodiment of the disclosure.

FIG. 7 is a block diagram showing a connection relationship of a supporter of a display apparatus according to an embodiment of the disclosure.

The supporter 150 may be electrically connected to the circuitry 80 provided on the rear chassis 60. The supporter 150 may be electrically connected to the printed circuit wiring 129 provided on the board 120. The printed circuit wiring 129 may be electrically connected to the circuitry 80 by the supporter 150.

More specifically, as the first supporter contact portion 151 is in contact with the printed circuit wiring 129 and the second supporter contact portion 152 is in contact with the rear chassis 60, the supporter 150 may electrically connect the circuitry 80 with the light source module 100. According to the electrical connection between the circuitry 80 and the light source module 100, the circuitry 80 may control the light source module 100. Accordingly, the backlight unit may implement a local dimming function.

Typically, to electrically connect a printed circuit wiring extending from a light source to a circuitry located in a rear chassis, it has been needed to design a detour of the printed circuit wiring up to the edge of a board, which complicates the process and deteriorates reliability against vibrations, etc.

However, the display apparatus 1 according to an embodiment of the disclosure may electrically connect the printed circuit wiring 129 extending from the light source 110 to the circuitry 80 located in the rear chassis 60 through the supporter 150 for maintaining a distance between the board 120 and the rear chassis 60, thereby simplifying the process and improving reliability against vibrations, etc.

In the display apparatus according to one or more embodiments of the disclosure, because the supporter is provided as an electrode, a detour of the printed circuit wiring may be not needed, and accordingly, the process may be simplified.

In the display apparatus according to one or more embodiments of the disclosure, because the supporter is provided as an electrode, reliability may be improved.

Although embodiments have been shown and described, the disclosure is not limited to the above-described embodiments, and various modifications can be made by those skilled in the art without departing from the inventive concept of the disclosure defined by the claims below.

What is claimed is:

1. A display apparatus comprising:
   a display panel;
   a light source module provided behind the display panel, the light source module comprising a board and a light source provided on a rear surface of the board;
   a rear chassis covering a rear surface of the light source module; and
   a supporter positioned between the board and the rear chassis to maintain a constant distance between the board and the rear chassis, the supporter being electrically connected to the board and the rear chassis.

2. The display apparatus of claim 1, wherein the board comprises a glass material.

3. The display apparatus of claim 1, further comprising a printed circuit wiring extending from the light source and electrically connected to the supporter,
   wherein the printed circuit wiring is provided on the rear surface of the board.

4. The display apparatus of claim 1, further comprising a printed circuit wiring extending from the light source and electrically connected to the supporter,
   wherein the printed circuit wiring comprises a wiring contact portion contacting the supporter.

5. The display apparatus of claim 1, further comprising a circuitry provided on the rear chassis and configured to control the light source module,
   wherein the supporter is electrically connected to the circuitry.

6. The display apparatus of claim 1, wherein the supporter supports the board and the rear chassis to maintain the constant distance between the board and the rear chassis.

7. The display apparatus of claim 1, wherein the supporter has a shape of a cone, a cylinder, a polyprism, or a polypyramid.

8. The display apparatus of claim 1, wherein the supporter comprises metal.

9. The display apparatus of claim 1, further comprising a light conversion member provided between the display panel and the light source module, the light conversion member comprising a Quantum Dot (QD) device.

10. The display apparatus of claim 9, further comprising an optical sheet provided between the display panel and the light conversion member.

11. The display apparatus of claim 1, wherein the light source contacts the rear chassis.

12. The display apparatus of claim 1, wherein the light source is configured to emit light in a direction in which the light source is mounted on the board.

13. The display apparatus of claim 1, wherein the board is configured to diffuse light received from the light source.

14. The display apparatus of claim 1, wherein the board is configured to transmit light emitted from the light source.

15. The display apparatus of claim 1, wherein an emitting surface of the light source, from which light is emitted, is adjacent to a mounting surface of the board.

* * * * *